(12) United States Patent
Xi

(10) Patent No.: US 8,319,438 B2
(45) Date of Patent: Nov. 27, 2012

(54) CIRCUIT FOR DETECTING COMPUTER STATES

(75) Inventor: Chun-Fang Xi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 461 days.

(21) Appl. No.: 12/760,452

(22) Filed: Apr. 14, 2010

(65) Prior Publication Data

US 2011/0181428 A1 Jul. 28, 2011

(30) Foreign Application Priority Data

Jan. 26, 2010 (CN) .......................... 2010 1 0300741

(51) Int. Cl.
*H05B 41/00* (2006.01)

(52) U.S. Cl. ..................... 315/119; 315/307; 315/209 R; 315/129; 315/133

(58) Field of Classification Search ............... 315/209 R, 315/119–123, 125, 127–133, 136, 186, 192, 315/193, 210, 225, 226, 291, 294, 297, 299, 315/301, 306, 307, 308, 312, 313, 320, 361, 315/362; 713/300, 340
See application file for complete search history.

(56) References Cited

U.S. PATENT DOCUMENTS

2010/0308739 A1* 12/2010 Shteynberg et al. .......... 315/193
* cited by examiner

*Primary Examiner* — Douglas W Owens
*Assistant Examiner* — Jianzi Chen
(74) *Attorney, Agent, or Firm* — Altis Law Group, Inc.

(57) ABSTRACT

A circuit that can detect computer states. When the computer in a S3 state, a S3 state pin of the computer is at low level, and a S4 state pin of the computer is at high level. A first light emitting diode is turned on and emits light, indicating that the computer is in the S3 state. The circuit also detects an S4 state, a network state, a hard disk state, a network awakening state, a network booting state, a low power state, and a management engine state of the computer according to seven other light emitting diodes.

19 Claims, 1 Drawing Sheet

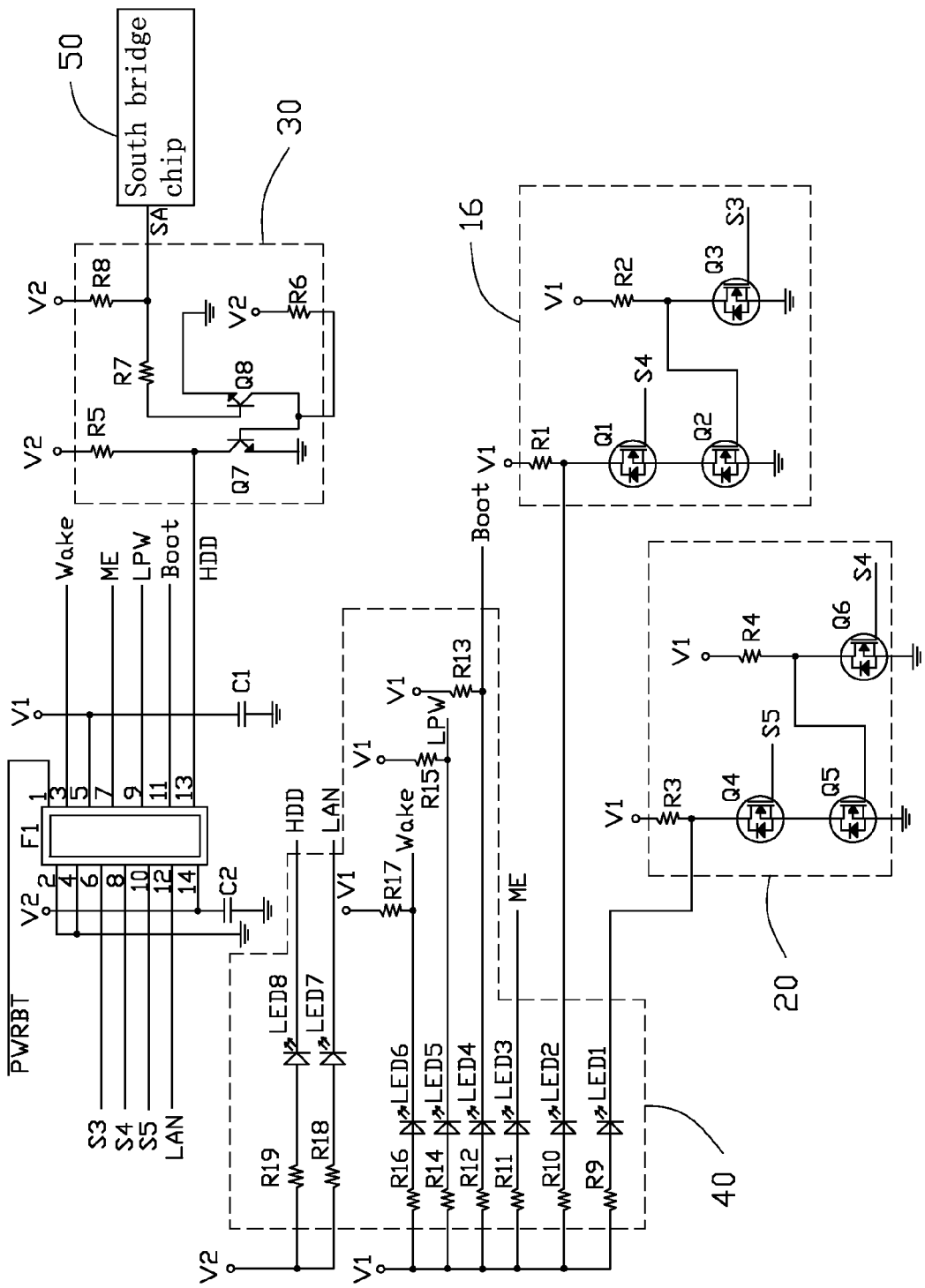

CIRCUIT FOR DETECTING COMPUTER STATES

BACKGROUND

1. Technical Field

The present disclosure relates to a circuit for detecting states of a computer.

2. Description of Related Art

According to definition of advanced configuration and power interface (ACPI) standard, a computer system may work in a variety of states, such as an S3 state (power saving state), an S4 state (hibernation state) etc. Users may also access a basic input/output system (BIOS) of the computer system to set other states, such as an enabling or a disabling state of network awakening. For testing, technicians may manually check the states by observing and analyzing the working characteristics of the computer system. However, if many computer states are to be determined, it becomes difficult for the technicians to deal with manually, thereby making the state determining process inefficient and prone to errors.

BRIEF DESCRIPTION OF THE DRAWING

The drawing is a circuit diagram of an exemplary embodiment of a circuit for detecting computer states.

DETAILED DESCRIPTION

Referring to the drawing, an exemplary embodiment of a circuit is used to detect an S3 state, an S4 state, a network state, a hard disk state, a network awakening state, a network booting state, a low power state, and a management engine (ME) state of a computer. The circuit includes a motherboard slot (e.g., front panel slot) F1 mounted on a motherboard of the computer, an S3 state detection circuit 16, an S4 state detection circuit 20, a hard disk state detection circuit 30, a result display circuit 40, and a south bridge chip 50.

The motherboard slot F1 includes two ground pins 2 and 4, two power supply pins 5 and 14, an S3 state pin 6, an S4 state pin 8, an S5 state pin 10, a network pin 12, a power on pin 1, a network awakening pin 3, a management engine pin 7, a low power pin 9, a network booting pin 11, and a hard disk pin 13. The ground pins 2 and 4 are grounded. The power on pin 1 is connected to a power on signal terminal PWRBT. The power supply pin 5 is connected to a power supply V1, and also is grounded via a capacitor C1. The power supply pin 14 is connected to a power supply V2, and also grounded via a capacitor C2. In this embodiment, the power supply V1 is a 3.3 volt (V) standby power supply, and the power supply V2 is a 3.3V system power supply.

The S3 state detection circuit 16 includes three transistors Q1, Q2, and Q3, and two resistors R1 and R2. A drain of the transistor Q1 is connected to the result display circuit 40, and is also connected to the power supply V1 via the resistor R1. A gate of the transistor Q1 is connected to the S4 state pin 8 of the motherboard slot F1. A source of the transistor Q1 is connected to a drain of the transistor Q2. A source of the transistor Q2 is grounded. A gate of the transistor Q2 is connected to a drain of the transistor Q3. The drain of the transistor Q3 is also connected to the power supply V1 via the resistor R2. A gate of the transistor Q3 is connected to the S3 state pin 6 of the motherboard slot F1. A source of the transistor Q3 is grounded. In this embodiment, the transistors Q1, Q2 and Q3, functioning as electronic switches, are n-channel metal oxide semiconductor field effect transistors (NMOS-FETs). In other embodiments, the transistor Q1, Q2 and Q3 can be other types of electronic switches, such as npn bipolar junction transistors.

The S4 state detection circuit 20 includes three transistors Q4, Q5, and Q6, and two resistors R3 and R4. A drain of the transistor Q4 is connected to the result display circuit 40, and is also connected to the power supply V1 via the resistor R3. A gate of the transistor Q4 is connected to the S5 state pin 10 of the motherboard slot F1. A source of the transistor Q4 is connected to a drain of the transistor Q5. A source of the transistor Q5 is grounded. A gate of the transistor Q5 is connected to a drain of the transistor Q6. The drain of the transistor Q6 is also connected to the power supply V1 via the resistor R4. A gate of the transistor Q6 is connected to the S4 state pin 8 of the motherboard slot F1. A source of the transistor Q6 is grounded. In this embodiment, the transistors Q4, Q5, and Q6, functioning as electronic switches, are NMOS-FETs. In other embodiments, the transistors Q4, Q5, and Q6 can be other types of electronic switches, such as npn bipolar junction transistors.

The hard disk state detection circuit 30 includes two transistors Q7 and Q8, and four resistors R5-R8. A collector of transistor Q7 is connected to the hard disk pin 13, and is also connected to the power supply V2 via the resistor R5. An emitter of the transistor Q7 is grounded. A base of the transistor Q7 is connected to the power supply V2 via the resistor R6, and is also connected to a collector of the transistor Q8. An emitter of the transistor Q8 is grounded. A base of the transistor Q8 is connected to a hard disk control pin SA of the south bridge chip 50 via the resistor R7. A first terminal of the resistor R8 is connected to the power supply V2, and a second terminal of the resistor R8 is connected to a node between the resistor R7 and the hard disk control pin SA of the south bridge chip 50. In this embodiment, the transistors Q7 and Q8, functioning as electronic switches, are npn bipolar junction transistors. In other embodiments, the transistors Q7 and Q8 can be other types of electronic switches, such as NMOS-FETs.

The result display circuit 40 includes eight light emitting diodes LED1-LED8, and eleven resistors R9-R19. An anode of the light emitting diode LED1 is connected to the power supply V1 via the resistor R9, and a cathode of the light emitting diode LED1 is connected to the drain of the transistor Q4. An anode of the light emitting diode LED2 is connected to the power supply V1 via the resistor R10, and a cathode of the light emitting diode LED2 is connected to the drain of the transistor Q1. An anode of the light emitting diode LED3 is connected to the power supply V1 via the resistor R11, and a cathode of the light emitting diode LED3 is connected to the management engine pin 7 of the motherboard slot F1. An anode of the light emitting diode LED4 is connected to the power supply V1 via the resistor R12, and a cathode of the light emitting diode LED4 is connected to the network booting pin 11 of the motherboard slot F1, and is also connected to the power supply V1 via the resistor R13. An anode of the light emitting diode LED5 is connected to the power supply V1 via the resistor R14, a cathode of the light emitting diode LED5 is connected to the low power pin 9 of the motherboard slot F1, and is also connected to the power supply V1 via the resistor R15. An anode of the light emitting diode LED6 is connected to the power supply V1 via the resistor R16, a cathode of the light emitting diode LED6 is connected to the network awakening pin 3 of the motherboard slot F1, and is also connected to the power supply V1 via the resistor R17. An anode of the light emitting diode LED7 is connected to the power supply V2 via the resistor R18, and a cathode of the light emitting diode LED7 is connected to the network pin 12 of the motherboard slot F1. An anode of the light emitting diode LED8 is connected to the power supply V2 via the resistor R19, and a cathode of the light emitting diode LED8 is connected to the hard disk pin 13 of the motherboard slot F1.

Levels of the S3 state pin 6, the S4 state pin 8, and the S5 state pin 10 are shown in the table below when the computer is in an S0 (normal operating) state, the S3 (power saving) state, the S4 (hibernation) state, and the S5 (power off) state, respectively.

| Pin | S0 state (level) | S3 state (level) | S4 state (level) | S5 state (level) |
|---|---|---|---|---|
| S3 state pin 6 | High level | Low level | Low level | Low level |
| S4 state pin 8 | High level | High level | Low level | Low level |
| S5 state pin 10 | High level | High level | High level | Low level |

Levels of the low power pin 9, the network awakening pin 3, the network booting pin 11, and the management engine pin 7 are shown in the table below when the low power, the network awakening, the network booting, and the ME of the computer are in an enabling state and a disabling state, respectively.

| Pin | Enabling state (level) | Disabling state (level) |
|---|---|---|
| low power pin 9 | Low level | High level |
| network awakening pin 3 | Low level | High level |
| network booting pin 11 | Low level | High level |
| management engine pin 7 | Low level | High level |

The following describes how the circuit detects the S3 state of the computer. When the computer is in the S3 state, the S3 state pin 6 is at low level (e.g., 0V), and the S4 state pin 8 is at high level (e.g., 3V). The transistor Q3 is turned off, the gate of the transistor Q2 is at high level, and the transistor Q2 is turned on. The gate of the transistor Q1 is at high level, and the transistor Q1 is turned on. The drain of the transistor Q1 is at low level, the light emitting diode LED2 is turned on and emits light, indicating that the computer is in the S3 state. On the contrary, that is, when the S3 state pin 6 is at high level and the S4 state pin 8 is at low level, the light emitting diode LED2 is turned off and does not emit light, indicating that the computer is not in the S3 state.

The following describes how the circuit detects the S4 state of the computer. When the computer is in the S4 state, and the S4 state pin 8 is at low level, and the S5 state pin 10 is at high level. The transistor Q6 is turned off. The gate of the transistor Q5 is at high level, and the transistor Q5 is turned on. The gate of the transistor Q4 is at high level, and the transistor Q4 is turned on. The drain of the transistor Q4 is at low level, the light emitting diode LED1 is turned on and emits light, indicating that the computer is in the S4 state. On the contrary, that is, when S4 state pin 8 is at high level and S5 state pin 10 is at low level, the light emitting diode LED1 is turned off and does not emit light, indicating that the computer is not in the S4 state.

The following describes how the circuit detects the ME state of the computer. When ME state is enabled, the management engine pin 7 is at low level, and the light emitting diode LED3 is turned on and emits light, indicating that the ME state is enabled. When the ME state is disabled, the management engine pin 7 is at high level, and the light emitting diode LED3 is turned off and does not emit light, indicating that the ME state is disabled.

The following describes how the circuit detects the network booting state of the computer. When the network booting state is enabled, the network booting pin 11 is at low level, and the light emitting diode LED4 is turned on and emits light, indicating that the network booting state is enabled. When the network booting state is disabled, the network booting pin 11 is at high level, and the light emitting diode LED4 is turned off and does not emit light, indicating that the network booting state is disabled.

The following describes how the circuit detects the low power state of the computer. When the low power state is enabled, the low power pin 9 is at low level, and the light emitting diode LED5 is turned on and emits light, indicating that the low power state is enabled. When the low power state is disabled, the low power pin 9 is at high level, and the light emitting diode LED5 is turned off and does not emit light, indicating that the low power state is disabled.

The following describes how the circuit detects the network awakening state of the computer. When the network awakening state is enabled, the network awakening pin 3 is at low level, and the light emitting diode LED6 is turned on and emits light, indicating that the network awakening state is enabled. When the network awakening state is disabled, the network awakening pin 3 is at high level, and the light emitting diode LED6 is turned off and does not emit light, indicating that the network awakening state is disabled.

The following describes how the circuit detects the network state of the computer. When the computer is connected to an internet cable, the network pin 12 is at low level, and the light emitting diode LED7 is turned on and emits light, indicating that the computer is connected to the internet cable. When the computer is not connected to an internet cable, the network pin 12 is at high level, and the light emitting diode LED7 is turned off and does not emit light, indicating that the computer is not connected to the internet cable.

The following describes how the circuit detects the hard disk state of the computer. When the hard disk is transferring data with other devices of the computer, the hard disk control pin SA of the south bridge chip 50 outputs high and low level signals (e.g., 01). When the control pin SA of the south bridge chip 50 outputs a high level signal, the transistor Q8 is turned on, and the transistor Q7 is turned off. The hard disk pin 13 is at high level, and the light emitting diode LED8 is turned off and does not emit light. When the hard disk control pin SA of the south bridge chip 50 outputs a low level signal, the transistor Q8 is turned off, and the transistor Q7 is turned on. The hard disk pin 13 is at low level, and the light emitting diode LED8 is turned on and emits light. Therefore, the light emitting diode LED8 emits a blinking light, indicating that hard disk of the computer is transferring data.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A circuit for detecting computer states, the circuit comprising:
   a first light emitting diode (LED) comprising an anode connected to a first power supply, and a cathode;

a first electronic switch comprising a first terminal connected to the cathode of the first LED and also connected to the first power supply via a first resistor, a second terminal connected to a hibernation state pin of a motherboard slot of the computer, and a third terminal;

a second electronic switch comprising a first terminal connected to the third terminal of the first electronic switch, a second terminal, and a third terminal grounded; and a third electronic switch comprising a first terminal connected to the second terminal of the second electronic switch and also connected to the first power supply via a second resistor, a second terminal connected to a power saving state pin of the motherboard slot of the computer, and a third terminal grounded;

wherein when the computer is in a power saving state, the power saving pin is at low level, and the hibernation state pin is at high level, the third electronic switch is turned off, the first and second electronic switches are turned on, the first LED is turned on and emits light.

2. The circuit of claim 1, wherein the first to third electronic switches are n-channel metal oxide semiconductor field effect transistors (NMOSFETs), and the first to third terminals of the first to third electronic switches are drains, gates, and sources of the NMOSFETs, respectively.

3. The circuit of claim 1, wherein the anode of the first LED is connected to the first power supply via a third resistor.

4. The circuit of claim 1, further comprising fourth to sixth electronic switches, and a second LED, wherein a first terminal of the fourth electronic switch is connected to a cathode of the second LED, and is also connected to the first power supply via a third resistor, an anode of the second LED is connected to the first power supply, a second terminal of the fourth electronic switch is connected to a power off state pin of the motherboard slot, a third terminal of the fourth electronic switch is connected to a first terminal of the fifth electronic switch, a second terminal of the fifth electronic switch is connected to a first terminal of the sixth electronic switch, a third terminal of the fifth electronic switch is grounded, the first terminal of the sixth electronic switch is also connected to the first power supply via a fourth resistor, a second terminal of the sixth electronic switch is connected to the hibernation state pin of the motherboard slot, a third terminal of the sixth electronic switch is grounded, wherein when the computer is in a hibernation state, the hibernation state pin is at low level, and the power off state pin is at high level, the sixth electronic switch is turned off, the fourth and the fifth electronic switches are turned on, and the second LED is turned on and emits light.

5. The circuit of claim 4, wherein the fourth to sixth electronic switches are n-channel metal oxide semiconductor field effect transistors (NMOSFETs), and the first to third terminals of the fourth to sixth electronic switches are drains, gates, and sources of the NMOSFETs, respectively.

6. The circuit of claim 4, wherein the anode of the second LED is connected to the first power supply via a fifth resistor.

7. The circuit of claim 1, further comprising a fourth and a fifth electronic switches, and a second LED, wherein a first terminal of the fourth electronic switch is connected to a hard disk pin of the motherboard slot, and is also connected to a second power supply via a third resistor, a second terminal of the fourth electronic switch is grounded, a third terminal of the fourth electronic switch is connected to the second power supply via a fourth resistor, and is also connected to a first terminal of the fifth electronic switch, a second terminal of the fifth electronic switch is grounded, a third terminal of the fifth electronic switch is connected to a hard disk control pin of a south bridge chip of the motherboard of the computer via a fifth resistor, a first terminal of a seventh resistor is connected to the second power supply, a second terminal of the sixth resistor is connected to a node between the fifth resistor and the hard disk control pin of the south bridge chip, an anode of the second LED is connected to the second power supply, a cathode of the second LED is connected to the hard disk pin of the motherboard slot, wherein when a hard disk of the computer is transferring data, the hard disk control pin of the south bridge chip outputs high and low level signals alternatively, when the control pin of the south bridge chip outputs a high level signal, the fifth electronic switch is turned on, and the fourth electronic switch is turned off, the hard disk pin is at high level, and the second LED is turned off and does not emit light, wherein when the hard disk control pin of the south bridge chip outputs a low level signal, the fifth electronic switch is turned off, and the fourth electronic switch is turned on, the hard disk pin is at low level, and the second LED is turned on and emits light.

8. The circuit of claim 7, wherein the fourth and fifth electronic switches are npn bipolar junction transistors, and the first to third terminals of the electronic switches are collectors, emitters, and bases of the transistors, respectively.

9. The circuit of claim 7, wherein the anode of the second LED is connected to the second power supply via a seventh resistor.

10. The circuit of claim 1, further comprising a second LED, wherein an anode of the second LED is connected to the first power supply, a cathode of the second LED is connected to a management engine pin of the motherboard slot, when a management engine state of the computer is enabled, the management engine pin is at low level, and the second LED is turned on and emits light, when the management engine state of the computer is disabled, the management engine pin is at high level, and the second LED is turned off and does not emit light.

11. The circuit of claim 10, wherein the anode of the second LED is connected to the first power supply via a third resistor.

12. The circuit of claim 10, further comprising a third LED, wherein an anode of the third LED is connected to the first power supply, a cathode of the third LED is connected to a network booting pin of the motherboard slot, and is also connected to the first power supply via a third resistor, wherein when the network booting state of the computer is enabled, the network booting pin is at low level, and the third LED is turned on and emits light, wherein when the network booting state of the computer is disabled, the network booting pin is at high level, and the third LED is turned off and does not emit light.

13. The circuit of claim 12, wherein the anode of the third LED is connected to the first power supply via a fourth resistor.

14. The circuit of claim 12, further comprising a fourth LED, wherein an anode of the fourth LED is connected to the first power supply, a cathode of the fourth LED is connected to a low power pin of the motherboard slot, and is also connected to the first power supply via a fourth resistor, wherein when a low power state of the computer is enabled, the low power pin is at low level, and the fourth LED is turned on and emits light, wherein when the low power state is disabled, the low power pin is at high level, and the fourth LED is turned off and does not emit light.

15. The circuit of claim 14, wherein the anode of the fourth LED is connected to the first power supply via a fifth resistor.

16. The circuit of claim 14, further comprising a fifth LED, wherein an anode of the fifth LED is connected to the first power supply, a cathode of the fifth LED is connected to a network awakening pin of the motherboard slot, and is also connected to the first power supply via a fifth resistor, wherein when a network awakening state of the computer is enabled, the network awakening pin is at low level, and the fifth LED is turned on and emits light, wherein when the network awakening state of the computer is disabled, the network awakening pin is at high level, and the fifth LED is turned off and does not emit light.

17. The circuit of claim 16, wherein the anode of the fifth LED is connected to the first power supply via a sixth resistor.

18. The circuit of claim 16, further comprising a sixth LED, wherein an anode of the sixth LED is connected to a second power supply, a cathode of the sixth LED is connected to a network pin of the motherboard slot, wherein when the computer is connected to an internet cable, the network pin is at low level, and the sixth LED is turned on and emits light, wherein when the computer is not connected to an internet cable, the network pin is at high level, and the sixth LED is turned off and does not emit light.

19. The circuit of claim 18, wherein the anode of the sixth LED is connected to the second power supply via a sixth resistor.

* * * * *